March 26, 1929.  J. F. SCHILLER ET AL  1,706,594
METHOD OF STERILIZING AIR
Filed May 14, 1924  3 Sheets-Sheet 3
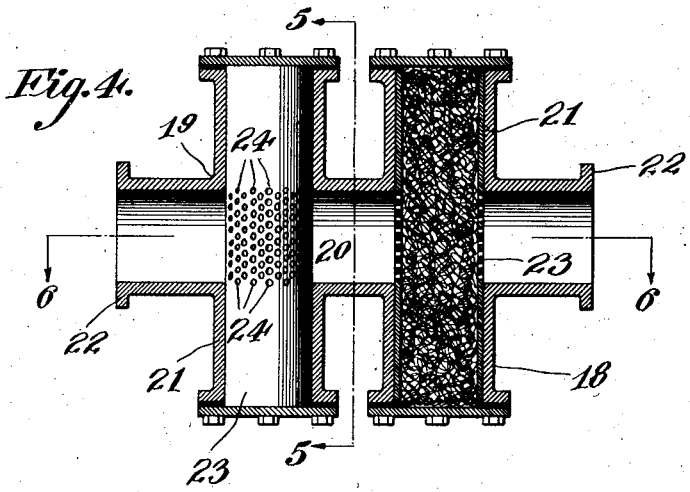
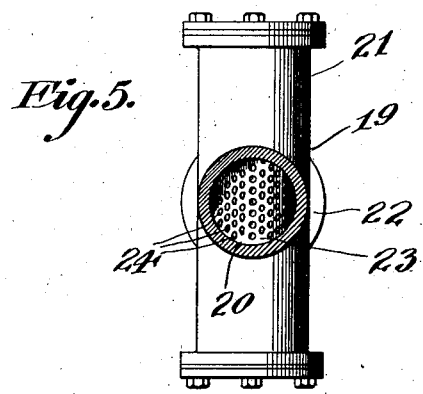
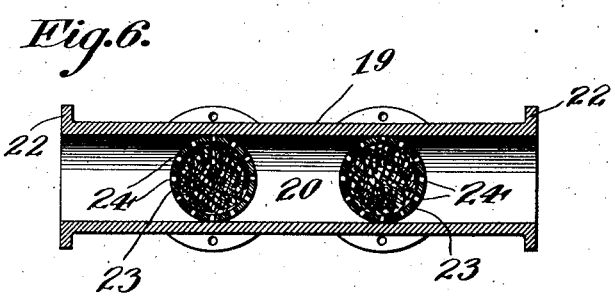
Inventors
Joseph F. Schiller
Walter W. Wescott
By Joshua R. H. Potts
Their Attorney Patented Mar. 26, 1929.

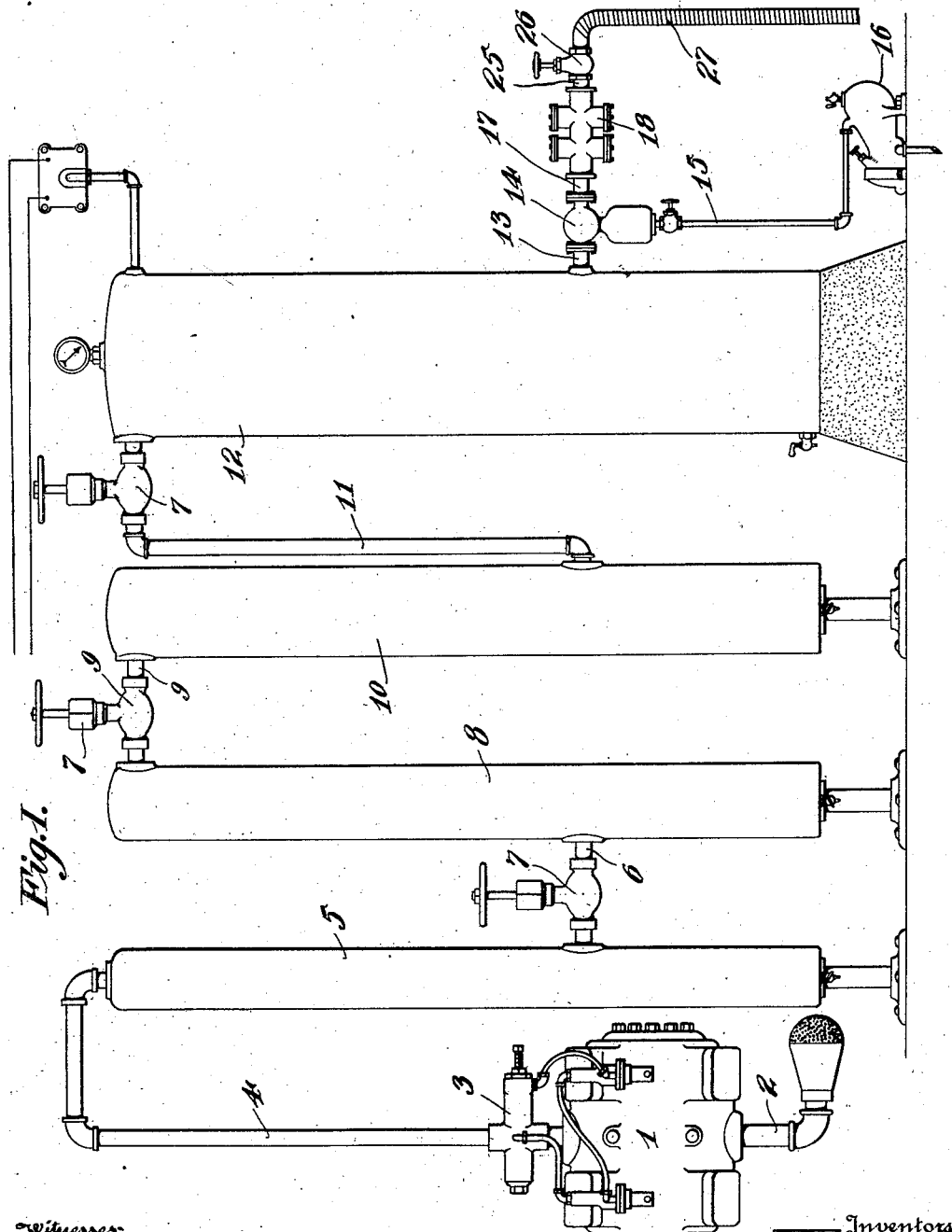

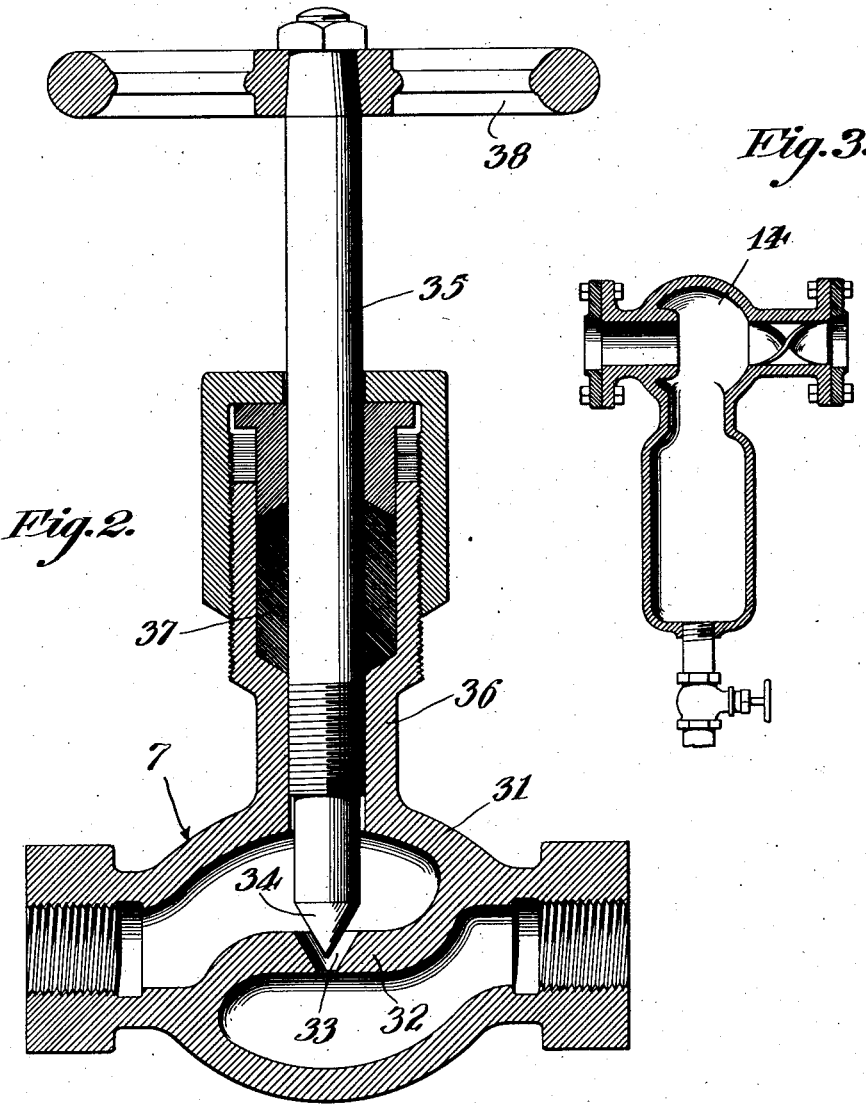

1,706,594

UNITED STATES PATENT OFFICE.

JOSEPH F. SCHILLER AND WALTER W. WESCOTT, OF PHILADELPHIA, PENNSYLVANIA, ASSIGNORS OF TWO-THIRDS TO SAID JOSEPH F. SCHILLER AND ONE-THIRD TO SAID WALTER W. WESTCOTT.

METHOD OF STERILIZING AIR.

Application filed May 14, 1924. Serial No. 713,165.

There is a wide field for use of pure sterilized air especially when used under compression. It may be used for unloading or transferring milk or other liquids in which freedom from bacteria and other impurities is required. In the milk industry it may be utilized not only for unloading or transferring milk but for cleansing the pipe lines; cleansing the pasteurizing system; agitating milk in storage tanks, freeing the milk from objectionable odors and a variety of like purposes, but for these purposes it is essential that the air be freed from bacteria, oil and other impurities.

Milk is usually unloaded and transferred by pumping apparatus which involves much agitation of the milk and is injurious to its creaming capacity. It is well recognized that milk should be gently handled and that compressed air, if it could be utilized without contamination of the milk, would provide an agency for transferring milk more gently than it could be done by any other power operated means. Various attempts have been made to utilize it for this purpose but, so far as we are aware these attempts have failed because the milk was so contaminated as to render the use of compressed air disastrous.

We have discovered that by comparatively simple means, air may be completely sterilized and purified and may be used for handling milk, or for other purposes without danger of contamination from the air.

The objects of our invention are to provide a simple and efficient method of sterilizing and purifying air by a single operation and simple and efficient apparatus whereby the method may be carried into effect.

In the drawings,

Figure 1 is a side elevation showing the purposed form of our apparatus,

Figure 2 a vertical section of a needle valve which we employ,

Figure 3 a vertical section of an oil separator,

Figure 4 a central section of an air filtering device,

Figure 5 a section on line 5—5 of Figure 4, and

Figure 6 a section on line 6—6 of Figure 4.

The numeral 1 indicates the air compressor which may be of any usual type, 2 the intake pipe, 3 the starting unloader, 4 the air outlet pipe which leads to the top of an expansion tank 5, shown as of cylinder form, 6 a connection, including a needle valve 7, between expansion tank 5 and a second expansion tank 8, 9 a connection, including a needle valve between expansion tank 8 and a third expansion tank 10, 11 a pipe leading from expansion tank 10 and communicating, through a needle valve, with a fourth tank 12 hereinafter called the receiving tank, 13 a pipe leading from the receiving tank to an oil separator 14 which may be of the type used for separating oil from steam. From the oil separator a drain pipe 15 leads to a trap 16. A pipe 17 leads from the oil separator to an air filter 18. The filter consists of a spider 19 having a central bore 20, a pair of cylindrical parts 21 extending at right angles from the bore and pipe connections 22. The cylindrical parts are adapted to receive sleeves 23 which are packed with wool adapted for filtering purposes. The sleeves are perforated, as indicated at 24, at that part of their periphery which is in line with bore 20 to afford passage for the air. A pipe 25 leads from the discharge end of the bore and is provided with a valve 26 and with means for connections with a flexible pipe 27 which may lead to a milk tank upon a car or truck or to any point at which it is desired to use the compressed air.

If milk is to be unloaded from a truck tank another flexible pipe, not shown, will lead from the tank to the receptacle into which the milk is to be transferred which may be upon a different level such as another floor.

The needle valves are of the screw type and consist of a union 31 having a partition 32 provided with a frusto conical opening 33 adapted to receive a conical valve member 34 carried by a stem 35 screw threaded in a standard 36 enclosing an air tight packing 37 and carrying a handwheel 38 by which the space between valve member 34 and its seat may be increased or diminished at will.

Destruction of the bacteria is apparently effected by rapid expansion of the compressed and heated air. We have not ascertained the exact degree of expansion required for destroying the bacteria but find that with the compressor raising the pressure of the air to approximately three atmospheres or higher, expansion until the pressure drops to approximately 2½ atmospheres is sufficient. We prefer to expand until the temperature drops to 40° or slightly below. To effect that result we prefer the form of apparatus disclosed in the drawings. The expansion tanks and the receiving tanks are 8 feet in length, the first expansion tank is 8 inches in diameter, the second 10 inches, the third 12 inches and the receiving tank 18 inches, and the pipe leading from the compressor to the first expansion tank 2 inches in diameter. This apparatus is adjusted for a pressure of 45 pounds with the discharge closed. By use of the apparatus we produce air that is sterile and free from oil and other impurities.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. The herein described method of sterilizing air consisting in compressing air to approximately three atmospheres and then expanding it by several steps successively in minute streams to a pressure of approximately two and one-half atmospheres.

2. The herein described method of sterilizing air consisting in compressing air to approximately three atmospheres and then expanding it step by step successively through a series of needle valves to a pressure of approximately two and one-half atmospheres.

In testimony whereof we have signed our names to this specification.

JOSEPH F. SCHILLER.
WALTER W. WESCOTT.